United States Patent
Xia et al.

(10) Patent No.: US 6,347,135 B1
(45) Date of Patent: Feb. 12, 2002

(54) APPARATUS AND METHOD FOR POWERING A TELEPHONE-BASED INBOUND TELEMETRY DEVICE

(75) Inventors: Yongping Xia; Joshua S. Zhu, both of Torrance, CA (US)

(73) Assignee: Teldata, Inc., Los Angeles, CA (US)

( * ) Notice: Subject to any disclaimer, the term of this patent is extended or adjusted under 35 U.S.C. 154(b) by 0 days.

(21) Appl. No.: 09/563,023

(22) Filed: May 2, 2000

(51) Int. Cl.[7] .............................................. H04M 11/00
(52) U.S. Cl. ........................... 379/106.03; 379/106.04; 379/106.07
(58) Field of Search ..................... 379/106.03, 106.04, 379/106.05, 106.06, 106.07, 106.08, 412; 340/870.01, 870.02

(56) References Cited

U.S. PATENT DOCUMENTS

| | | |
|---|---|---|
| 4,180,709 A | 12/1979 | Cosgrove et al. |
| 4,489,220 A | 12/1984 | Oliver |
| 4,540,849 A | 9/1985 | Oliver |
| 4,578,536 A | 3/1986 | Oliver et al. |
| 4,646,342 A | 2/1987 | Hargrave et al. |
| 4,654,868 A | 3/1987 | Shelley |
| 4,654,869 A | 3/1987 | Smith et al. |
| 4,710,919 A | 12/1987 | Oliver et al. |
| 4,833,618 A | 5/1989 | Verma et al. |
| 4,839,917 A | 6/1989 | Oliver |
| 4,866,761 A | 9/1989 | Thornborough et al. |
| 5,134,650 A | 7/1992 | Blackmon |
| 5,189,694 A | 2/1993 | Garland |
| 5,197,095 A | 3/1993 | Bonnet et al. |
| 5,202,916 A | 4/1993 | Oliver |
| 5,204,896 A | 4/1993 | Oliver |
| 5,235,634 A | 8/1993 | Oliver |
| 5,243,644 A | 9/1993 | Garland et al. |
| 5,311,581 A | 5/1994 | Merriam et al. |
| 5,377,260 A | 12/1994 | Long |
| 5,434,911 A | 7/1995 | Gray et al. |
| 5,454,031 A | 9/1995 | Gray et al. |
| 5,485,509 A | 1/1996 | Oliver |
| 5,488,654 A | 1/1996 | Oliver |
| 5,677,947 A | 10/1997 | Oliver |
| 5,682,422 A | 10/1997 | Oliver |

OTHER PUBLICATIONS

"Outline Specification For A Meter Interface Unit for use with PSTN No Ring Calls" by K. E. Nolde BT Laboratories, May 8, 1993.

*Primary Examiner*—Curtis Kuntz
*Assistant Examiner*—Melur. Ramakrishnaiah
(74) *Attorney, Agent, or Firm*—Leydig, Voit & Mayer, Ltd

(57) ABSTRACT

A telephone-based automatic meter reading (AMR) system includes a telemetry device through which a host computer can collect meter readings remotely. The telemetry device has one or more ports to read one or more meters at pre-scheduled time intervals. All data read from the meter(s) is stored in a non-volatile memory in the device, and the collected data is transferred back to the host computer according to a predetermined schedule (with a call back interval that can be hourly, daily, weekly or monthly). An apparatus and method is provided which enables the host computer to initiate a special data stream to invoke a powerless circuit portion of the telemetry device—specifically, a telephone-side portion which is electrically isolated from the meter-side circuitry (such as by an optocoupler). The ringing signal on the phone line powers the circuitry in this telephone-side portion of the device such that no AC connection or separate battery power is required. Once the telemetry device receives the special data stream, it ignores the regular call back schedule and calls back to the host computer immediately when the shared telephone line is available.

12 Claims, 3 Drawing Sheets

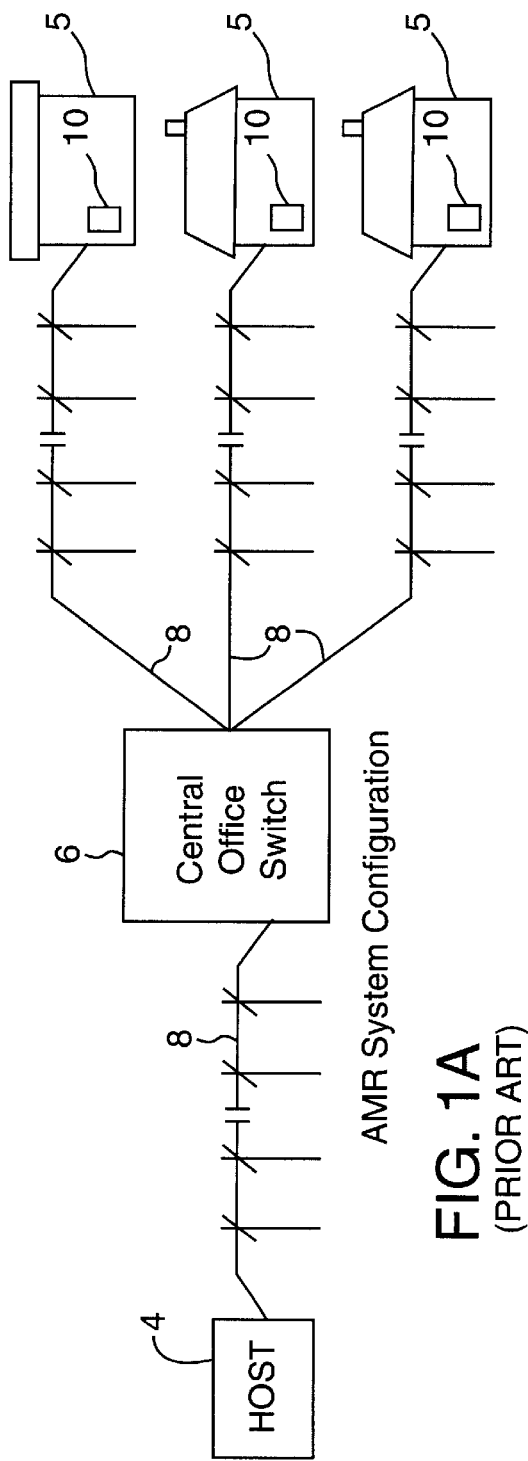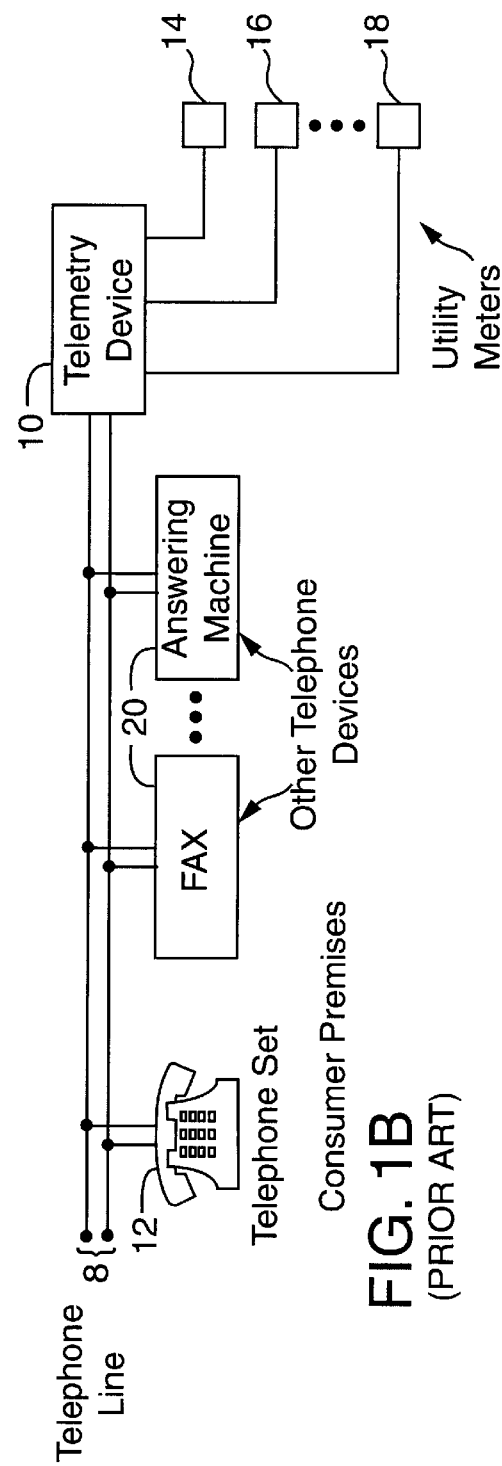

APPARATUS AND METHOD FOR POWERING A TELEPHONE-BASED INBOUND TELEMETRY DEVICE

TECHNICAL FIELD OF THE INVENTION

The present invention relates generally to a data collection system with remote units for telemetrically transferring data to a central processing location, and more particularly, to an automatic meter reading (AMR) system in which conventional subscriber telephone lines are used to transfer collected data (e.g., utility meter readings) from a customer's premises to a central processor.

BACKGROUND OF THE INVENTION

A traditional way to collect data from utility meters (e.g., gas, electric, water) at customer sites is to send a person to read the respective meters periodically. An automatic meter reading (AMR) system, as illustrated in FIGS. 1A and 1B, changes this labor intensive data collection procedure. With an AMR system, utility companies not only can reduce the number of necessary meter reading personnel, but also can get more information from the meters. For instance, an AMR system can be set to record the meter data every 15 minutes and store the data in memory. A processing center or host computer can then periodically retrieve and analyze the collected data, such that the information may be used to compile peak time and maximum usage statistics, to work with a customer to establish rates, to notify the customer if an abnormal usage is identified, and ultimately to provide better customer services.

Since telephone infrastructure has been established for many years and reaches almost every corner of the country, it is one of the logical choices to use as the AMR system communication means. A typical AMR system configuration is shown in FIG. 1A where a utility company (or meter reading service) utilizes a host computer system 4 to collect data from a plurality of consumers (homes, apartments, businesses, etc.) over the existing telephone system. In certain applications, the host computer system may be co-resident with a telephone central office switch 6 or it may be remotely located (as shown), appearing as just another subscriber telephone line 8 to the central office switch 6. At each consumption point, a telephone line telemetry device 10 is connected to one or more utility meters (not shown), thereby making the meters electronically accessible to a host computer system via the existing public telephone network.

As shown in more detail in FIG. 1B, the design of telemetry device 10 is such that it operates over the same telephone line 8 as the subscriber's telephone set 12 so there is no need for additional phone lines or infrastructure. In AMR applications, the telemetry device 10 is called a meter interface unit (MIU) or telemetry interface unit (TIU), since the device serves as an interface between two different electrical environments. One side of MIU telemetry device 10, called the meter side, is connected to one or more utility meters 14, 16, 18, while the remaining side of the MIU is connected in parallel across the subscriber telephone line 8. With regard to the telephone-line-side of the MIU, the connection is electrically equivalent to the homeowner plugging in an additional telephone or answering machine, and telemetry device 10 appears in parallel with the other telephone devices 20 which are connected to the phone line. As shown in FIG. 1B, other than connecting MIU 10 to the subscriber line, no modification of the existing telephone line wiring is required.

The MIU telemetry device 10 can be designed to share the telephone line in a manner creating no interference for the customer. If a customer is using the phone 12 or the facsimile machine 20, the MIU device detects that the phone line 8 is not then available, and a call back to the host computer 4 (FIG. 1A) will not occur immediately, even though a scheduled call back time has been reached. Once the phone line becomes available, the device initiates a call to the host computer. The MIU dials automatically pursuant to a calling schedule and availability of the phone line, uploads the accumulated meter data to the host computer, and then turns itself off to again release the phone line. If the customer wants to use the phone while the MIU device is communicating with the host computer, the MIU immediately releases the phone line. As a result, the MIU is transparent to the customer during normal operation. Use by the MIU device of a toll-free 800 number to call the host computer and transfer meter data over the existing telephone line infrastructure further ensures that this is a zero impact event to the customer.

The AMR system just described is referred to as a dial-inbound system. The basic idea of dial-inbound is to let the MIU device initiate the call to the host computer (according to a call back schedule which is pre-programmed). At times, however, the utility company needs to know the meter reading immediately (such as when a customer moves out of a house) so they can prepare a final bill based on a final reading. To meet this requirement, an additional alert function is added to the dial-inbound MIU device. With this function, the MIU device will initiate a call to the host computer immediately after receiving an alert signal if a phone line is available. This is referred to typically as a dial-outbound function.

There are various ways to alert an MIU device. One way is to let the host computer 4 dial the MIU 10. If the number of rings exceeds a certain threshold number, the MIU device calls back after the phone line is available. It is tricky, however, to select this threshold number. If the number is too small, a normal phone call may trigger the MIU to initiate an unwanted call back. One the other hand, if the number is too large, say more than five, an answering machine 20 may activate before the number of rings ever reaches five, such that the MIU device cannot be alerted.

Another way to alert the MIU device is to use a special stream of data. Once a person or an answering machine picks up the phone, the host computer 4 sends out this special data stream. The MIU device 10 decodes the received data stream and, if the stream matches a predetermined alert code, the MIU will call back the host computer when the phone line is available. The data stream should be complex enough that normal voice and/or fax data streams will not trigger the MIU's alert function. In conjunction with either the ring alert or the special data stream alert, the inbound MIU device must be capable of accepting a demand call.

Since the MIU device is physically connected both to utility meters and a telephone line, a certain breakdown voltage (>1,500V) is required between the telephone terminal and the meter terminals. The best way to electrically isolate the two sides is to use an optocoupler. Depending on the specific components utilized, the break down voltage can easily exceed 5 KV, which is higher than the U.S. and European safety requirements.

In this preferred design, when the telephone side of the MIU 10 is isolated by an optocoupler, the alert function circuitry on the telephone side cannot be powered by the meter-side power source (i.e., an AC power line connection or a battery). In order to avoid using a separate, additional battery for the telephone-side circuitry, the present invention uses the telephone ring pulses to provide the power necessary to support the alert function circuit. A low-powered microcontroller is employed in the telephone-side circuitry to decode the special data stream. When an alert data stream is identified, the telephone-side microcontroller sends out an alert trigger signal to a meter-side microcontroller through the optocoupler. The meter-side microcontroller then initiates a data-transmitting call to the host computer 4 as soon as the phone line 8 is available.

SUMMARY OF THE INVENTION

Accordingly, one object of the present invention is to provide a dial-inbound MIU telemetry device having the additional capability of being on-demand activated by a data signal, wherein data received in the activating signal instructs the MIU to open one or more selected meter interface ports.

Another object of the present invention is to provide such an MIU telemetry device having two inter-communicating, but electrically-isolated, circuit portions, one of which is connected to the telephone line and the other of which is connected to one or more utility meters.

Yet another object of the present invention is to provide such an MIU telemetry device having an optocoupler for achieving the electrically-isolated inter-communication between the respective MIU circuit portions.

A still further object of the present invention is to provide such an MIU telemetry device in which the telephone-side portion of the MIU circuitry is powered by the telephone ring pulses associated with the data signal.

In accordance with a preferred embodiment of the present invention, there is provided an MIU telemetry device for collecting information at a remote location and transmitting the information over a telephone line to a host station, the telemetry device including at least one meter port, a first microcontroller which collects information from the meter port(s) and transmits the collected information to the host station, a first power supply for powering the first microcontroller, a second microcontroller coupled to the telephone line but electrically isolated from the meter port (s), the first microcontroller and the first power supply, wherein the second microcontroller detects when data signals received from the host station contain an alert signal and, upon such detection, provides a trigger signal to the first microcontroller to initiate collection of information from the meter port(s), and a second power supply for the second microcontroller which derives energy from ring pulse signals received from the host station and at least temporarily stores the derived ring energy.

BRIEF DESCRIPTION OF THE DRAWINGS

The detailed description particularly refers to the accompanying figures, in which:

FIG. 1A is a block diagram of a conventional AMR system;

FIG. 1B is a block diagram of conventional telephone device equipment, including an MIU telemetry device, located at the utility customer's premises;

DETAILED DESCRIPTION OF THE INVENTION

While the invention will be described in connection with certain preferred embodiments, it will be understood that it is not intended to limit the invention to these particular embodiments. On the contrary, it is intended to cover all alternatives, modifications and equivalents included within the spirit and scope of the invention as defined by the appended claims.

Figure 2:
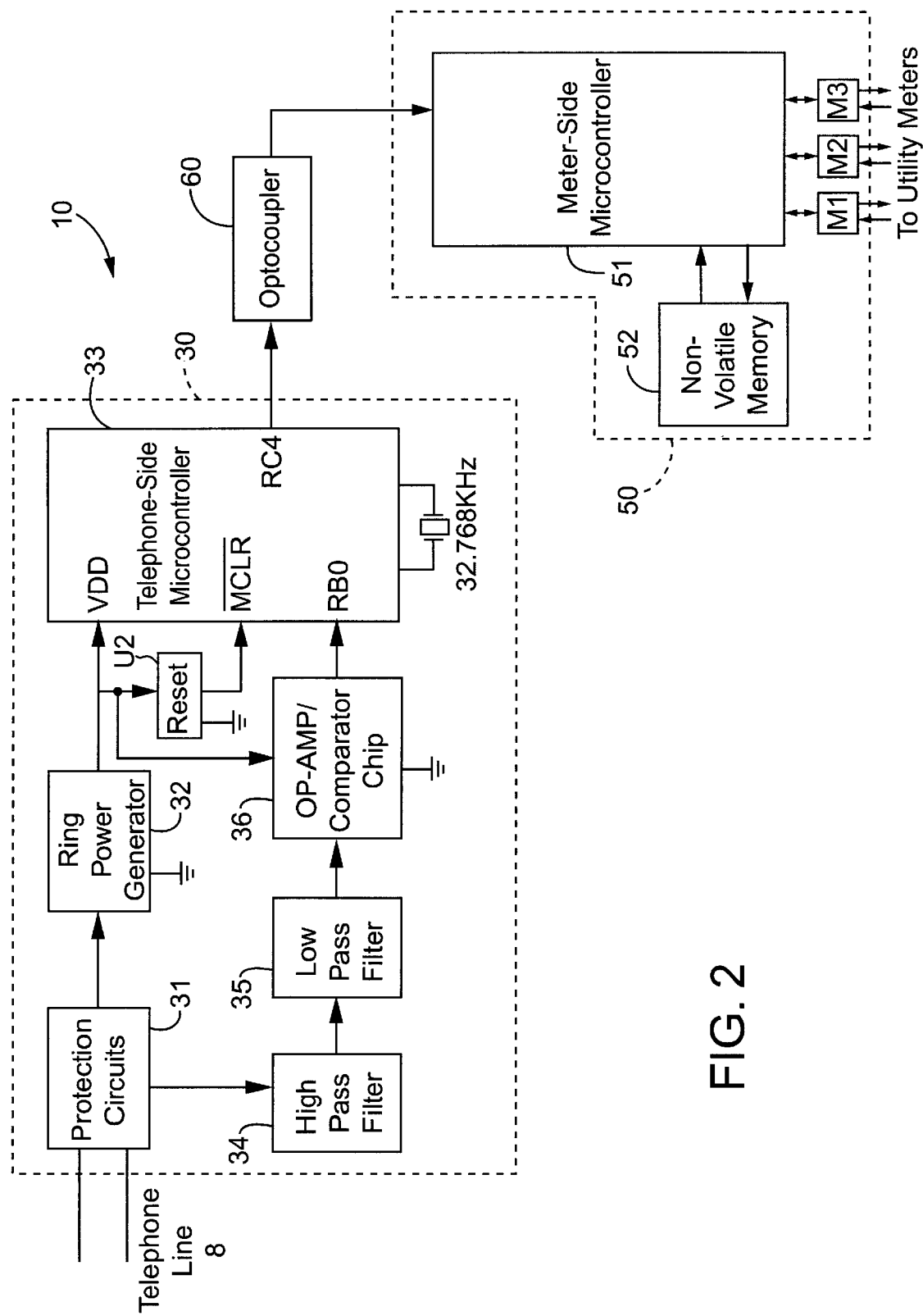
FIG. 2 is a block diagram of an embodiment of the inventive MIU telemetry device having an optocoupler positioned between the telephone-side circuitry and the meter-side circuitry.

Turning now to the drawings and referring first to FIG. 2, there is shown a block diagram of the inventive MIU telemetry device 10 having telephone-side circuitry 30 which receives and processes signals from the telephone line 8, meter-side circuitry 50 which is coupled to, and collects data from, a plurality of utility meters (not shown), and an optocoupler 60 positioned electrically between the telephone-side circuitry and the meter-side circuitry. The meter-side circuitry 50 (comprising, among other common components, a microcontroller 51, non-volatile memory 52, and several meter interface ports M1–M3) for purposes of collecting, storing and transmitting data from the plurality of utility meters is conventional and well-known in the art, as is the design and operation of common telephone line status components of the MIU device, including a static off-hook detector (not shown), a dynamic off-hook detector (not shown) and a ring detector (not shown). These common components are described in U.S. Pat. No. 5,682,422 (co-assigned herewith), the disclosure of which is incorporated herein by reference.

As shown in FIG. 2, signals received by the telephone-side circuitry 30 of the MIU device 10 via the subscriber phone line 8 follow two different paths once they have passed through protection circuitry 31. One path is to a ring power generator 32, which provides a temporary power supply for the various components of the telephone-side circuitry, including the microcontroller 33 that handles the decoding of the incoming signals. The second path leads to a high pass filter 34 (which rejects low frequency noise—especially the 60 Hz power line noise) and a low pass filter 35 (which rejects high frequency noise). Following these filtering stages, the analog signals are amplified and converted into digital signals by an op-amp/comparator IC chip 36 and sent to the microcontroller 33. Firmware in the microcontroller operates in accordance with conventional practice to decode the incoming digital data stream and compare it with a stored alert code. If it is determined that the decoded data stream includes a signal matching the stored alert code, the telephone-side microcontroller sends an alert trigger signal to the meter-side microcontroller 51 through the optocoupler 60. This signal triggers the collection, storage and transmission of appropriate utility meter data by the meter-side microcontroller.

Figure 3:
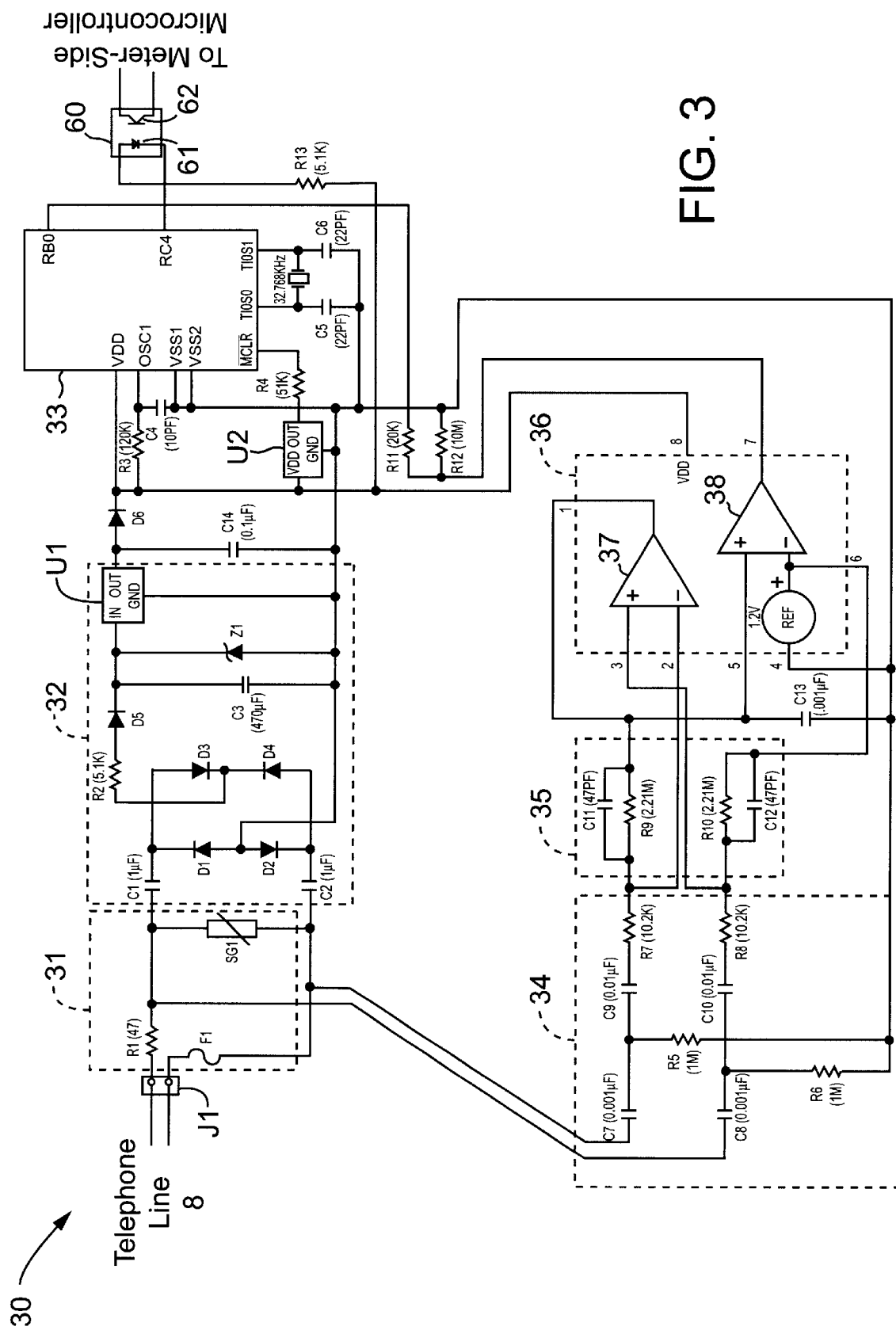
FIG. 3 is a schematic diagram of an embodiment of the inventive MIU telemetry device's telephone-side circuitry and optocoupler.

Turning now to FIG. 3, there is shown a detailed schematic of the telephone-side circuitry 30 of the MIU device 10 illustrated in FIG. 2. A conventional telephone connector J1 couples the device to the subscriber's telephone line 8. Received signals are immediately coupled to a pair of protection circuits—specifically, a 47Ω resistor R1 and a polyswitch F1 (which limit possible large transient currents) and a surge protector SG1 (which absorbs transient high voltage).

In accordance with an important aspect of the present invention, the ring power generator 32 provides a power supply using the ring signals received during an incoming call. First, the ring signals are coupled by a pair of 1μF capacitors C1, C2, and then rectified by a diode bridge D1–D4. The rectified ring signals are applied to a capacitor C3 through a resistor R2 and a diode D5, whereby the capacitor C3 (470 μF in a preferred embodiment) stores the energy of the ring signals. The telephone ring energy voltage stored in this capacitor can be anywhere between 0 and 10V. An extra-low-power voltage regulator U1, connected in parallel with the capacitor C3, utilizes the stored ring energy to generate a regulated 3.3V output voltage. This voltage regulator (for example, an RN5RL33A unit available from Ricoh) provides a constant output power supply voltage as long as the voltage on the capacitor C3 exceeds 3.3V. A zener diode Z1 connected in parallel with the capacitor C3 and the voltage regulator U1 prevents the voltage on the capacitor from exceeding the limit allowed for the voltage regulator. The output of the voltage regulator U1 powers the telephone-side microcontroller 33 (which, in a preferred embodiment, is a low-power PIC16LC62 unit manufactured by Microchip) via a switching diode D6 and a power input pin VDD, as well as other telephone-side components.

A second voltage regulator U2 provides a clean reset signal that the telephone-side microcontroller requires when the power turns on. Since the ring power generator 32 has a slow charging slope, the second regulator U2 is implemented to provide a clean reset signal. More specifically, this regulator (which, in a preferred embodiment, is an RN5VL25C unit manufactured by Ricoh) generates a logic "low" reset signal when the output voltage of the first voltage regulator U1 is less than 2.5V. When the power supply output exceeds 2.5V, the reset signal generated by the second regulator U2 changes to the power supply voltage within about 100 microseconds. This clean reset signal is applied to the telephone-side microcontroller via a resistor R4 and an input pin $\overline{\text{MCLR}}$.

The telephone-side microcontroller 33 has dual clock inputs, which are critical for its desired operation. An RC oscillator comprising a resistor R3 and a capacitor C4 provides a first clock signal OSC1, which controls the speed of instruction execution within the microcontroller. The second clock signal is generated by a 32.768 KHz crystal oscillator, and provides proper pulses for the microcontroller to decode a 300-baud rate incoming data stream.

As shown in FIG. 3, the stream of data received from the phone line 8 is also applied, via a second path, first to a conventional high pass filter 34 (comprised of four capacitors C7–C10 and four resistors R5–R8) and then to a conventional low pass filter 35 (comprised of two resistors R9, R10 and two capacitors C11, C12). The analog outputs of these two filter stages are applied to the op-amp/comparator IC chip 36, wherein they are amplified and converted to digital signals. This IC chip 36 (preferably a MAX952 chip manufactured by Maxim) comprises an operational amplifier 37, a voltage comparator 38 and a 1.2V reference voltage generator. The two outputs of the high pass filter 34 are coupled, respectively, to the inputs of the operational amplifier 37 in the IC chip 36 (where they are converted from common mode inputs to a stream of differential mode outputs), as well as to the respective inputs of the two RC circuits in the low pass filter 35. The low pass filter rejects higher frequency noise for the amplifier. The analog signals output by the amplifier 37 are applied to an input of the comparator 38, whereby they are compared with the 1.2V reference voltage to create an output sequence of digital signals. This sequence of digital signals is provided to the telephone-side microcontroller 33 via a resistor network R11, R12 and an input pin RB0.

As explained previously, once the microcontroller 33 recognizes the stored alert pattern in the sequence of signals received through the input pin RB0, the signal output from its pin RC4 becomes "low". When this occurs, the generator 32 is allowed to power a light-emitting diode 61 in the optocoupler 60 (preferably model SFH618A-5 manufactured by Siemens) through a current limiting resistor R13. The emitted light from this LED turns on a phototransistor in the optocoupler. By checking the on/off status of this phototransistor, the meter-side microcontroller 51 (FIG. 2) determines when there is an alert trigger signal, and thus when an alert data stream has been sent by the host computer.

Since telephone ring pulses provide very limited energy, it will be appreciated that the components used in the telephone-side circuitry 30 preferably should be low-power devices. For example, if the voltage regulators U1 and U2 only use 1 uA current each, and the IC chip 36 consumes only 6 uA (even though it has an operational amplifier, a voltage comparator and a 1.2V voltage reference), the total power consumption of the telephone-side circuitry will be less than 50 uA. With such low power consumption, one full ring can support operation of this circuitry for approximately fifty seconds, which is long enough to allow the host computer to send out the special alert data stream, and for the MIU device to recognize the data stream and send an alert trigger signal to the meter-side microcontroller via the optocoupler.

What is claimed is:

1. A telemetry device for collecting information at a remote location and transmitting the information over a telephone line to a host station, the telemetry device comprising:
   at least one meter port;
   a first microcontroller which collects information from the at least one meter port and transmits the collected information to the host station;
   a first power supply for powering the first microcontroller;
   a second microcontroller, coupled to the telephone line but electrically isolated from the meter port, the first microcontroller and the first power supply, wherein the second microcontroller detects whether data signals received over the telephone line from the host station contain an alert signal and, upon detection of an alert signal, provides a trigger signal to the first microcontroller to initiate collection of information from the meter port; and
   a second power supply for powering the second microcontroller, wherein the second power supply derives energy from ring pulse signals received over the telephone line from the host station and at least temporarily stores the derived ring energy.

2. The telemetry device of claim 1 further comprising an optocoupler which electrically isolates the second microcontroller from the first microcontroller.

3. The telemetry device of claim 1 further comprising a comparator which converts analog data signals from the host station into digital signals.

4. The telemetry device of claim 1, wherein the second power supply comprises a capacitor which stores the energy derived from the ring pulse signals; and a first voltage regulator which utilizes the stored ring energy to generate a regulated output voltage.

5. The telemetry device of claim 4, wherein the first voltage regulator generates a constant output voltage as long as a voltage across the capacitor from the stored ring energy exceeds a predetermined minimum.

6. The telemetry device of claim 4 further comprising a second voltage regulator which provides a reset signal to the second microcontroller when the output voltage generated by the first voltage regulator exceeds a predetermined value.

7. The telemetry device of claim 2, wherein the optocoupler comprises a light-emitting diode which receives signals from the second microcontroller and which is powered by the second power supply and thus emits light when the second microcontroller detects an alert signal; and a phototransistor coupled to the first microcontroller which is turned on by the emitted light from the light-emitting diode, thus providing the trigger signal to the first microcontroller.

8. A method of powering circuit components in a telemetry device which collects information at a remote location and transmits the information over a telephone line to a host station, the method comprising the steps of:

connecting one or more first circuit components, including a first microcontroller, to a main power supply provided at the remote location;

providing a second power supply by deriving energy from ring pulses received over the telephone line from the host station and at least temporarily storing the derived ring energy; and connecting one or more second circuit components, including a second microcontroller, which are electrically isolated from the first circuit components and the main power supply, to the second power supply.

9. The method of claim 8, wherein the step of providing the second power supply comprises the steps of:

coupling a capacitor to the telephone line such that a voltage level is established across the capacitor as ring energy is stored; and coupling a voltage regulator to the capacitor, whereby a constant output voltage is generated as long as the voltage level across the capacitor exceeds a predetermined minimum value.

10. A method of collecting information from a meter port at a remote location and transmitting the information over a telephone line to a host station, the method comprising the steps of:

coupling a first microcontroller to the meter port such that information is collected therefrom and transmitted to the host computer;

providing a first power supply for powering the first microcontroller;

coupling a second microcontroller, which is electrically isolated from the meter port, the first microcontroller and the first power supply, to the telephone line, whereby the second microcontroller detects whether data signals received over the telephone line from the host station contain an alert signal and, upon detection of an alert signal, provides a trigger signal to the first microcontroller to initiate collection of information from the meter port; and providing a second power supply for powering the second microcontroller by deriving energy from ring pulse signals received over the telephone line from the host station and at least temporarily storing the derived ring energy.

11. The method of claim 10, wherein the second microcontroller is electrically isolated from the meter port, the first power supply and the first microcontroller by connecting an optocoupler between the first and second microcontrollers.

12. The method of claim 10, wherein the step of providing the second power supply comprises the steps of:

coupling a capacitor to the telephone line such that a voltage level is established across the capacitor as ring energy is stored; and coupling a voltage regulator to the capacitor, whereby a constant output voltage is generated as long as the voltage level across the capacitor exceeds a predetermined minimum level.

* * * * *